US010767546B2

(12) United States Patent
Lee et al.

(10) Patent No.: US 10,767,546 B2
(45) Date of Patent: Sep. 8, 2020

(54) ENGINE COOLING SYSTEM AND METHOD FOR VEHICLE APPLYING TURBOCHARGER

(71) Applicants: Hyundai Motor Company, Seoul (KR); Kia Motors Corporation, Seoul (KR)

(72) Inventors: Su-Ho Lee, Suwon-Si (KR); Eui-Chul Choi, Seoul (KR); Jun-Sik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/573,878

(22) Filed: Sep. 17, 2019

(65) Prior Publication Data
US 2020/0116071 A1    Apr. 16, 2020

(30) Foreign Application Priority Data
Oct. 16, 2018  (KR) .................. 10-2018-0123319

(51) Int. Cl.
*F01P 7/16*   (2006.01)
(52) U.S. Cl.
CPC ............ *F01P 7/16* (2013.01); *F01P 2023/08* (2013.01)
(58) Field of Classification Search
CPC ...... F01P 7/165; F01P 7/16; F01P 7/14; F01P 11/16; F01P 2037/00; F01P 2025/62
See application file for complete search history.

(56) References Cited

U.S. PATENT DOCUMENTS

| 10,202,886 B1* | 2/2019 | Teslovich ................ F01P 3/02 |
| 2006/0157000 A1* | 7/2006 | Lutze ..................... F01P 7/162 123/41.02 |
| 2006/0157002 A1* | 7/2006 | Pfeffinger ............... F01P 7/165 123/41.29 |

(Continued)

FOREIGN PATENT DOCUMENTS

| KR | 10-2017-0064638 A | 6/2017 |
| KR | 10-2019-0072865 A | 6/2019 |

*Primary Examiner* — Long T Tran
(74) *Attorney, Agent, or Firm* — Morgan, Lewis & Bockius LLP (57) ABSTRACT

A method for cooling the engine for the vehicle applying the turbocharger may include comparing an average fuel consumption amount that determines, by a control unit, for controlling the operation of the engine and the circulation of the coolant, whether an average fuel consumption amount consumed in the engine immediately before the start-off of the engine is greater than a predetermined after-start-up cooling entrance average fuel consumption amount when the vehicle is started-off after a high load operation, and maximally cooling that controls, by the control unit, so that the coolant cooled in a radiator is circulated into the engine and the turbocharger by maximally opening a thermostat for controlling, and operating a water pump, when the average fuel consumption amount consumed in the engine immediately before a start-off of the engine is greater than the predetermined after-start-up cooling entrance average fuel consumption amount in the comparing the average fuel consumption amount.

18 Claims, 9 Drawing Sheets

(56) References Cited

U.S. PATENT DOCUMENTS

| | | | |
|---|---|---|---|
| 2014/0209046 A1* | 7/2014 | Steiner | F01P 5/10 |
| | | | 123/41.31 |
| 2014/0261254 A1* | 9/2014 | Gonze | F01P 11/08 |
| | | | 123/41.08 |
| 2014/0299112 A1* | 10/2014 | Quix | F02B 29/0443 |
| | | | 123/559.1 |
| 2017/0361698 A1* | 12/2017 | Hussain | F01P 1/06 |
| 2018/0347454 A1* | 12/2018 | Wiegemann | B60K 11/02 |
| 2019/0186292 A1 | 6/2019 | Lee et al. | |
| 2019/0338696 A1* | 11/2019 | Guenter | F02B 29/0443 |

* cited by examiner

ENGINE COOLING SYSTEM AND METHOD FOR VEHICLE APPLYING TURBOCHARGER

CROSS-REFERENCE TO RELATED APPLICATION

The present application claims priority to Korean Patent Application No. 10-2018-0123319, filed on Oct. 16, 2018, the entire contents of which is incorporated herein for all purposes by this reference.

BACKGROUND OF THE DISCLOSURE

Field of the Disclosure

The present invention relates to an engine cooling system and method for a vehicle applying a turbocharger, which cool the turbocharger and an engine mounted with the turbocharger that are overheated upon engine-off immediately after a high load operation in the engine for the vehicle mounted with the turbocharger.

Description of Related Art

An engine is provided with a cooling system for cooling the heat generated by an operation of the engine.

Generally, a cooling circuit is configured so that coolant circulates the engine and a radiator, and circulates the coolant to cool the heated engine.

Furthermore, the coolant is also supplied to a turbocharger for operating with the engine in addition to the engine to cool the turbocharger.

Furthermore, the coolant is also circulated into an oil cooler for cooling the heated engine oil, and is also circulated into a heater core for heating a vehicle interior.

Meanwhile, in the engine cooling system according to the related art, a mechanical water pump for driving with the engine is operated, and when the engine is started-off, the circulation of the coolant is stopped with the start-off of the engine.

The circulation of the coolant is stopped with the start-off of the engine, such that when residual heat remains in some components of the engine compartment, the residual heat can cause heat damage, reducing durability.

Furthermore, there is a problem in that when the engine is started-off immediately after the high load traveling, the coolant is not circulated in a state where the turbocharger is at a high temperature, and is vaporized inside the turbocharger, generating noise.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine cooling system and method for a vehicle applying a turbocharger, in which coolant circulates the turbocharger and an engine for a predetermined time according to a coolant temperature and an engine oil temperature even if the engine is started-off immediately after the high load operation of the vehicle.

An engine cooling system for a vehicle applying a turbocharger according to an exemplary embodiment of the present invention for achieving the object, may include, in the engine cooling system for the vehicle including an engine, a radiator for cooling the coolant discharged from the engine, and a water pump for supplying the coolant discharged from the radiator to the engine, some of the coolant discharged from the engine is circulated into the turbocharger and flows into the water pump again, and may further include a thermostat mounted in a path through which the coolant discharged from the engine flows into the radiator, and for controlling the amount of the coolant from the engine to the radiator, and a control unit of controlling a circulation of the coolant according to a coolant temperature and an engine oil temperature, and the control unit is configured to control so that the coolant cooled in the radiator is additionally circulated into the engine and the turbocharger by maximally opening the thermostat so that the coolant flows from the engine to the radiator, and operating the water pump, when the engine is started-off while the engine operates at a high load of a predetermined after-start-up cooling entrance load, and an average fuel consumption amount consumed in the engine immediately before a start-off of the engine is greater than a predetermined after-start-up cooling entrance average fuel consumption amount.

The control unit determines the operating time of the water pump and the opening time of the thermostat, respectively, according to the coolant temperature and the average fuel consumption amount.

The control unit is configured to control so that the coolant cooled in the radiator is circulated into the engine and the turbocharger by not further opening the thermostat additionally and operating the water pump, when the engine is started-off while the engine operates at a high load of the predetermined after-start-up cooling entrance load, and the average fuel consumption amount consumed in the engine immediately before a start-off of the engine is not greater than the predetermined after-start-up cooling entrance average fuel consumption amount.

The control unit determines the operating time of the water pump according to the coolant temperature and the average fuel consumption amount.

The control unit determines whether the engine is operated at the high load of the after-start-up cooling entrance load or more that has been previously set to cool the engine and the turbocharger after the start-up of the engine, determines whether the cooling performance of the cooling system is good by comparing the coolant temperature and the engine oil temperature with a predetermined general coolant temperature and a predetermined general oil temperature, respectively to determine that the cooling performance is good while the engine is operated at the after-start-up cooling entrance load or more, and when the coolant temperature and the oil temperature are lower than the general coolant temperature and the general oil temperature, respectively, the control unit detects that the engine has been started-off while the engine is operated at the load of the after-start-up cooling entrance load or more, and then compares the average fuel consumption amount consumed in the engine with the predetermined after-start-up cooling entrance average fuel consumption amount.

The control unit compares the average fuel consumption amount consumed in the engine immediately before the start-off with the after-start-up cooling entrance average fuel consumption amount, when the coolant temperature is higher than a predetermined after-start-up cooling entrance coolant temperature, and the engine oil temperature is higher than a predetermined after-start-up cooling entrance oil temperature.

The control unit is configured to control so that the operation of the water pump is stopped with the start-off of the engine, and the thermostat is not opened additionally, when the coolant temperature is not higher than the predetermined after-start-up cooling entrance coolant temperature, or the engine oil temperature is not higher than the predetermined after-start-up cooling entrance oil temperature.

The control unit is an Electronic Control Unit (ECU), the water pump is an electric water pump and an operation of the electric water pump is controlled by the ECU, and the thermostat is an electric thermostat for controlling the flow rate of the coolant flowing into the radiator from the engine by the ECU.

Meanwhile, a method for cooling an engine for a vehicle applying a turbocharger according to an exemplary embodiment of the present invention may include, in the method for cooling the engine and the turbocharger after the start-up of the engine in the engine for the vehicle applying the turbocharger, comparing an average fuel consumption amount that determines, by a control unit of controlling an operation of the engine and a circulation of the coolant, whether an average fuel consumption amount consumed in the engine immediately before the start-off of the engine is greater than a predetermined after-start-up cooling entrance average fuel consumption amount when the vehicle is started-off after a high load operation, and maximally cooling that controls, by the control unit, so that the coolant cooled in a radiator is circulated into the engine and the turbocharger by maximally opening a thermostat for controlling so that the coolant flows from the engine to the radiator, and operating a water pump, when the average fuel consumption amount consumed in the engine immediately before a start-off of the engine is greater than the predetermined after-start-up cooling entrance average fuel consumption amount in the comparing the average fuel consumption amount.

Determining a maximum cooling operating time that determines the time at which the water pump may be operated additionally and the time at which the thermostat may be opened maximally is performed between the comparing the average fuel consumption amount and the maximally cooling.

In the determining the maximum cooling operating time, the operating time of the water pump and the opening time of the thermostat are determined, respectively, according to the coolant temperature and the average fuel consumption amount.

The method for cooling the engine for the vehicle applying the turbocharger may include assisting cooling that controls, by the control unit, so that the coolant cooled in the radiator is circulated into the engine and the turbocharger by not further opening the thermostat additionally and operating the water pump, when the average fuel consumption amount consumed in the engine immediately before a start-off of the engine is not greater than the predetermined after-start-up cooling entrance average fuel consumption amount in the comparing the average fuel consumption amount.

Determining a cooling assistance operating time that determines the time at which the water pump may be operated additionally is performed between the comparing the average fuel consumption amount and the assisting the cooling.

The determining the cooling assistance operating time determines the operating time of the water pump according to the coolant temperature and the average fuel consumption amount.

The method for cooling the engine for the vehicle applying the turbocharger may further include, before the comparing the average fuel consumption amount, acquiring engine operating information that acquires, by the control unit, the operating information related to the engine including the load of the engine for the traveling vehicle, the coolant temperature and the engine oil temperature having cooled the engine, and the fuel amount consumed in the engine, determining whether it is operated at a high load that determines, by the control unit, whether the engine is operated at the high load of the after-start-up cooling entrance load or more that has been previously set to cool the engine and the turbocharger after the start-up of the engine, determining whether cooling performance is good that determines, by the control unit, whether the cooling performance of the cooling system is good by comparing the coolant temperature and the engine oil temperature with a predetermined general coolant temperature and a predetermined general oil temperature, respectively to determine that the cooling performance is good while the engine is operated at the after-start-up cooling entrance load or more, and determining whether the engine is started-off immediately after a high load that senses, by the control unit, that the engine has been started-off while the engine operates at the load of the after-start-up cooling entrance load or more, when the coolant temperature and the oil temperature are lower than the general coolant temperature and the general oil temperature, respectively, and when the engine is started-off while the engine operates at the load of the after-start-up cooling entrance load or more, the comparing the average fuel consumption amount is performed.

When even any one of the determining whether it is operated at the high load, the determining whether the cooling performance is good, and the determining whether the engine is started-off immediately after the high load is not satisfied, it is returned to the determining whether it is operated at the high load.

The method for cooling the engine for the vehicle applying the turbocharger may further include determining whether it is the cooling entrance after the start-off that compares, by the control unit, the coolant temperature and the engine oil temperature with the predetermined after-start-up cooling entrance coolant temperature and the predetermined after-start-up cooling entrance oil temperature, respectively, between the determining whether the engine is started-off immediately after the high load and the comparing the average fuel consumption amount, and when the coolant temperature is higher than the after-start-up cooling entrance coolant temperature, and the engine oil temperature is higher than the after-start-up cooling entrance oil temperature in the determining whether it is the cooling entrance after the start-off, the comparing the average fuel consumption amount is performed.

When the coolant temperature is not higher than the after-start-up cooling entrance coolant temperature, or the engine oil temperature is not higher than the after-start-up cooling entrance oil temperature in the determining whether it is the cooling entrance after the start-off, normally cooling that also stops the operation of the water pump together with the start-off of the engine, and not opens the thermostat additionally is performed.

According to the engine cooling system and method for the vehicle applying the turbocharger of the present invention having the above configuration, the coolant is supplied to the engine and the turbocharger for a predetermined time based on the coolant temperature, the engine oil temperature, and the immediately-before-start-off average fuel consumption amount even if the engine is started-off immediately after the high load operation of the vehicle.

It is possible to solve a problem in that the parts forming the turbocharger are exposed to a high temperature for a long time to reduce the durability because the turbocharger is cooled even if the engine is started-off immediately after the high load operation. The bearing part of the turbocharger increases in temperature due to an increase in RPM upon the high load operation, and when the engine is operated, coolant is supplied to be cooled to an appropriate temperature, but when the engine is started-off immediately after the high load operation, the cooling is not performed in a state where the temperature has increased to occur the heat damage, reducing the durability. However, when the coolant circulates to perform the cooling even if the engine is started-off immediately after the high load operation, it is possible to prevent the heat damage of the turbocharger, improving the durability.

Furthermore, it is possible to continuously circulate the coolant inside the turbocharger even if the engine is started-off after the high load traveling, solving a problem in that the coolant is vaporized in the turbocharger. Therefore, the generation of noise caused by the vaporization of the coolant is prevented.

Furthermore, it is possible to solve a problem in that the coolant boils and overflows into the reservoir tank when the residual heat of the turbocharger is excessive, and some of the coolant is discharged to the outside, causing shortage of the coolant.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an engine cooling system and method for a vehicle applying a turbocharger according to an exemplary embodiment of the present invention will be described in detail with reference to the accompanying drawings.

Figure 1:
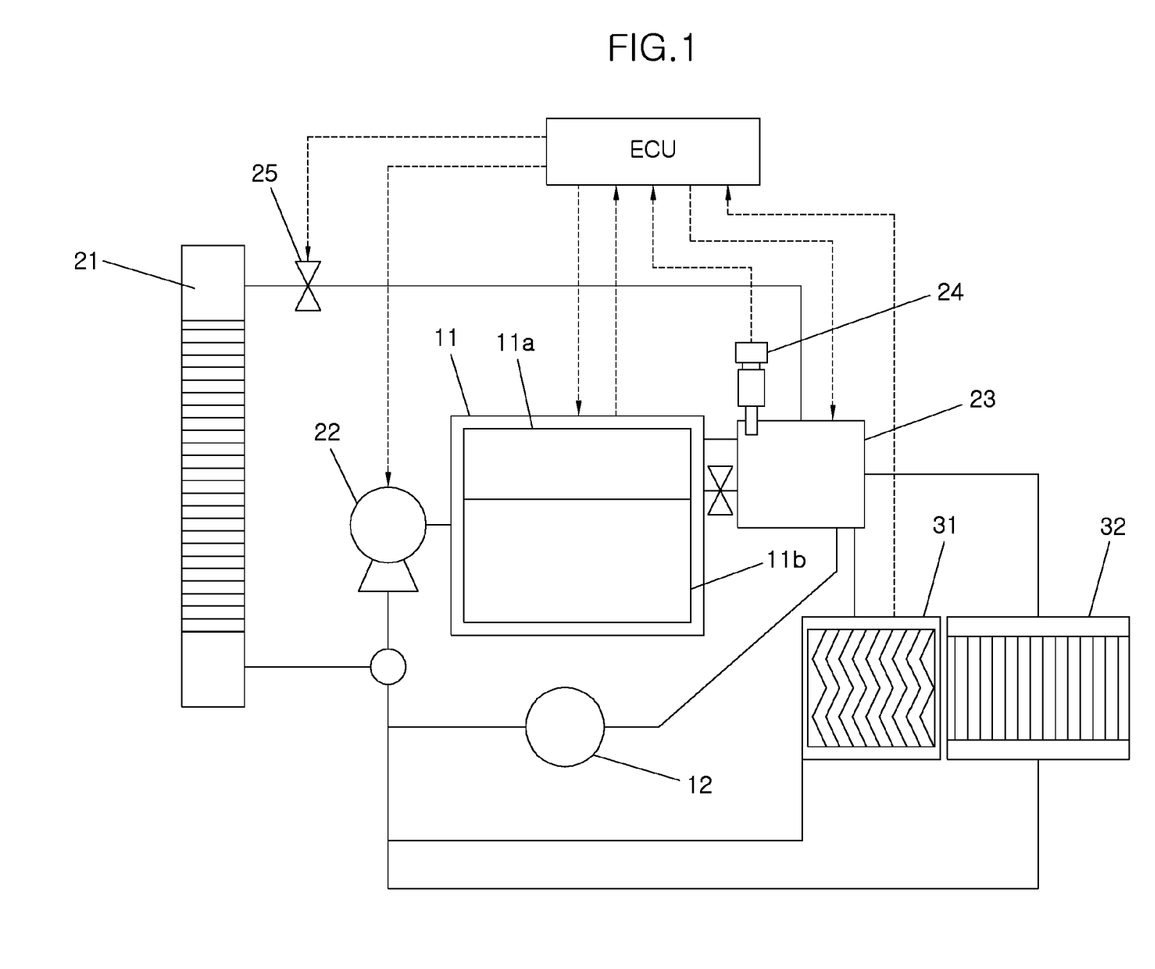
FIG. 1 is a block diagram illustrating an engine cooling system for a vehicle applying a turbocharger according to an exemplary embodiment of the present invention.

FIG. 1 is a diagram illustrating an engine cooling system for a vehicle applying a turbocharger.

An engine cooling system for a vehicle applying a turbocharger is configured so that the coolant can flow into a cylinder block 11b and a cylinder head 11a of an engine 11.

An electric water pump 22 transmits the coolant discharged from a radiator 21 to the cylinder block 11b and the cylinder head 11a to cool the engine 11. Some of the coolant having passed through the engine 11 is transmitted to the radiator 21 through a path distributor 23. A thermostat 25 configured for controlling the flow rate of the coolant is provided in a path through which the coolant is supplied from the engine 11 to the radiator 21. The thermostat 25 may be opened or closed or the opening amount thereof may be changed according to the state of the engine 11 to adjust the flow rate of the coolant cooled in the radiator 21.

The coolant discharged from the path distributor 23 is also transmitted to a turbocharger 12, an oil cooler 31, and a heater core 32. The coolant having passed through the turbocharger 12, the oil cooler 31, and the heater core 32 flows into and circulates the electric water pump 22.

A water temperature sensor 24 is provided to measure the coolant temperature discharged from the engine 11.

When a control unit receives the operating information related to the engine 11 including the load of the engine 11 for the vehicle, the coolant temperature and the engine oil temperature having cooled the engine 11, and the fuel amount consumed in the engine 11, the control unit controls the electric water pump 22, the thermostat 25, and the path distributor 23.

The water pump 22 is provided as the electric water pump 22 configured for controlling a circulation of the coolant by the control unit. Furthermore, the thermostat 25 is not a mechanical thermostat which is simply opened or closed by a temperature, but is also provided as the electric thermostat 25 configured for controlling the opening and closing and the opening amount by the control unit, and is controlled by the control unit.

A method for cooling the engine for the vehicle applying the turbocharger, which will be described later, is stored in the control unit, such that when the engine 11 is started-off after the high load operation, only the electric water pump 22 operates according to an immediately-before-start-off average fuel consumption amount (see FIG. 4), or the electric thermostat 25 is also opened with the operation of the electric water pump 22 (see FIG. 5) so that the engine 11 and the turbocharger 12 overheated by the high load operation are cooled.

Since the function of the control unit is described in detail in the method for cooling the engine for the vehicle applying the turbocharger, which will be described later, a detailed description thereof will be omitted.

Figure 2:
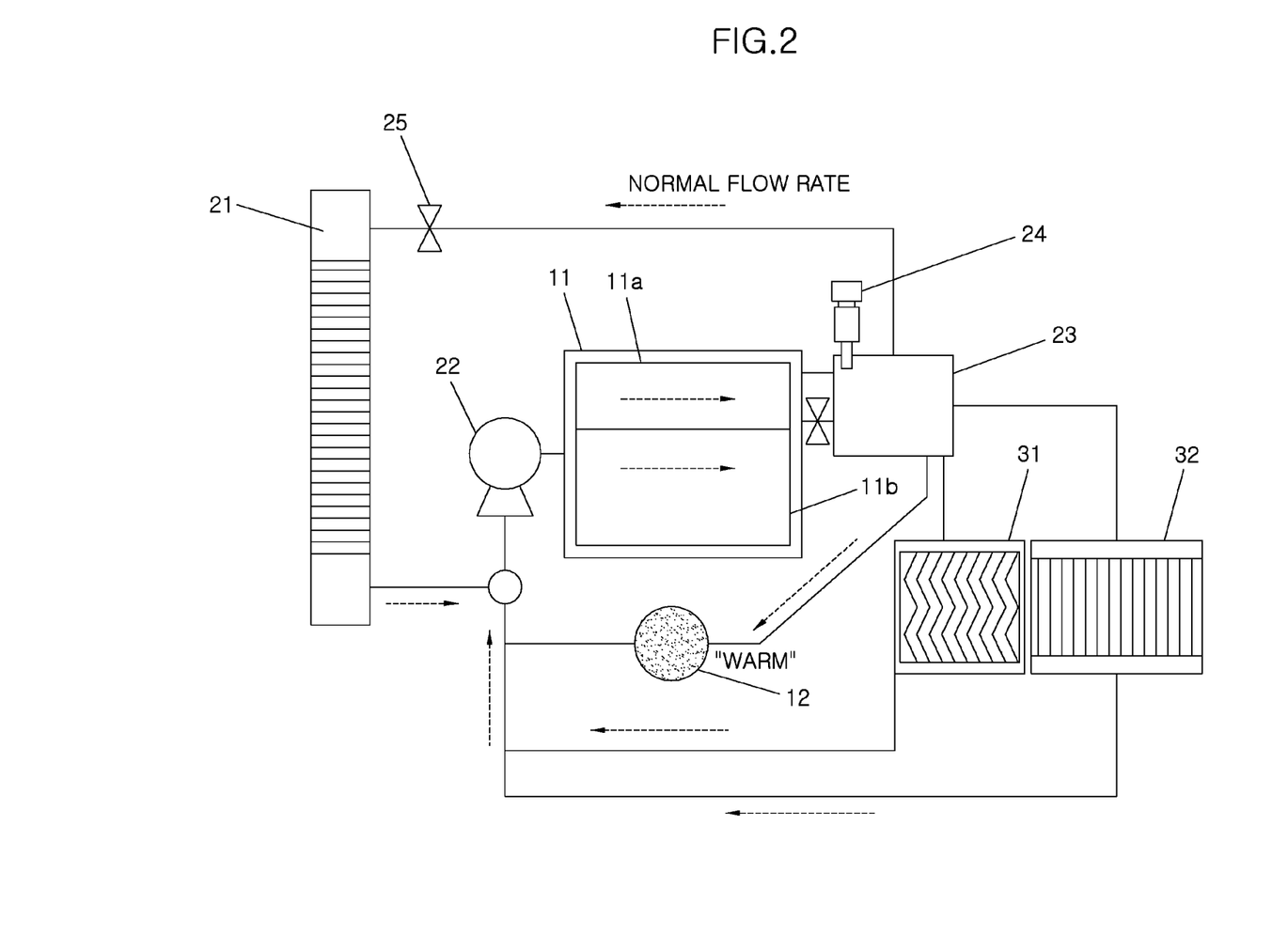
FIG. 2 is a block diagram illustrating the circulating state of coolant upon operation of an engine in the engine cooling system for the vehicle applying the turbocharger according to an exemplary embodiment of the present invention.

FIG. 2 is a diagram illustrating the flow state of coolant during the traveling of the vehicle.

When the engine 11 is operated, the electric water pump 22 is operated, and the electric thermostat 25 is opened (excluding upon cold). At the instant time, the operating amount of the electric water pump 22 and the opening amount of the electric thermostat 25 are adjusted according to the coolant temperature.

Most of the coolant discharged from the engine 11 circulates the radiator 21 and the electric water pump 22 through the path distributor 23 to cool the engine 11.

Furthermore, some of the coolant is supplied to the turbocharger 12 through the path distributor 23 to cool the turbocharger 12, and some of the coolant passes through the oil cooler 31 and the heater core 32.

During the traveling of the vehicle, as illustrated in FIG. 2, the ECU controls so that the general flow rate of the coolant, that is, the normal flow rate of the coolant is circulated, cooling the portion requiring cooling.

During the traveling of the vehicle, heat is generated from the engine 11 or the turbocharger 12, but an appropriate temperature is maintained by the circulation of the coolant.

Figure 3:
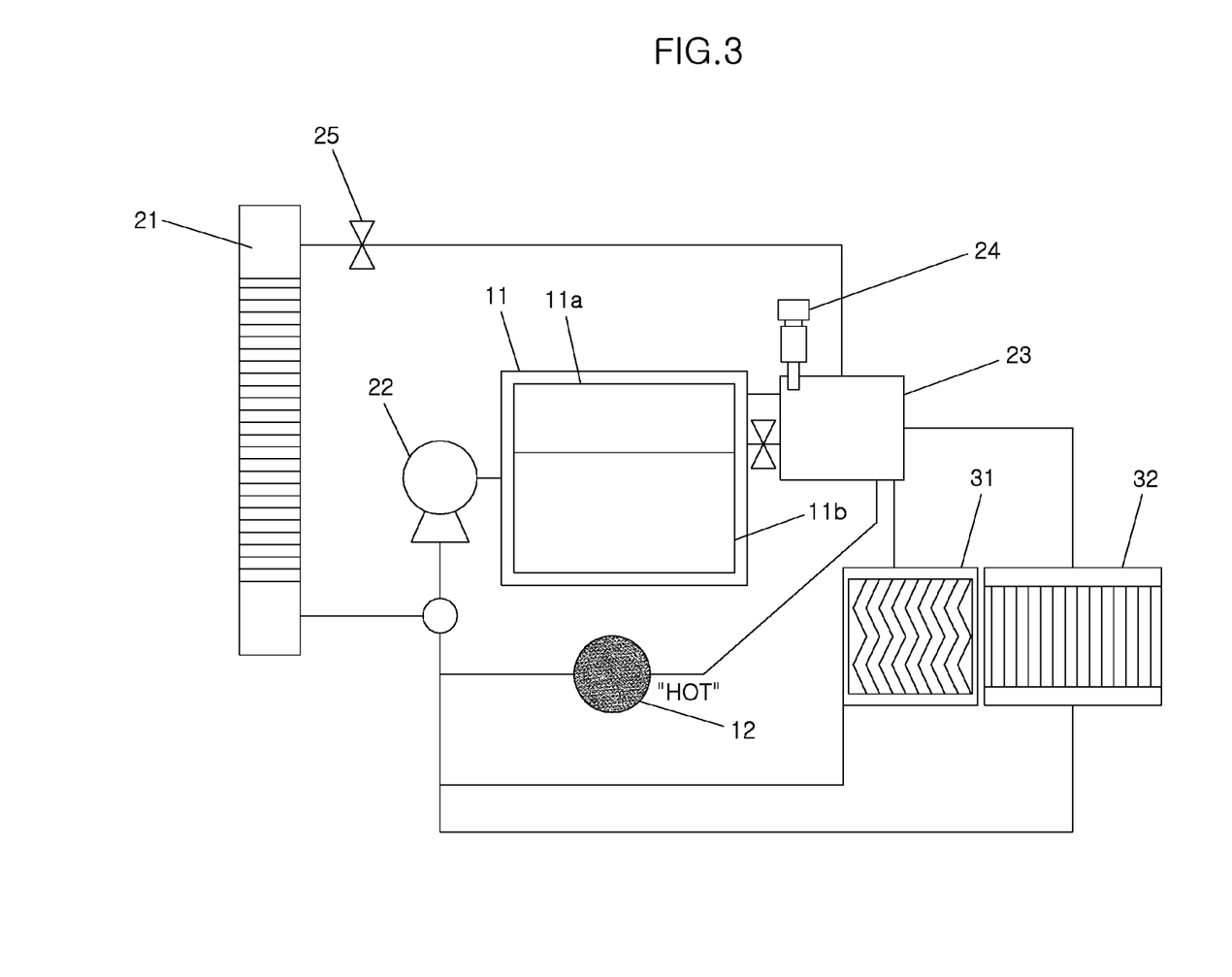
FIG. 3 is a block diagram illustrating a state where the circulation of the coolant has been stopped and the turbocharger has been overheated immediately after a high load operation in the engine cooling system for the vehicle applying the turbocharger according to an exemplary embodiment of the present invention.

FIG. 3 is a diagram illustrating a state where the engine 11 has been started-off after the engine 11 has been operated at a high load.

Since the operation of the electric water pump 22 is basically stopped in a state where the engine 11 has been started-off, the circulation of the coolant is stopped.

Therefore, the heat is continuously generated from the turbocharger 12 that has operated at a high speed immediately before the start-off, but the circulation of the coolant is stopped to become a high temperature.

Figure 4:
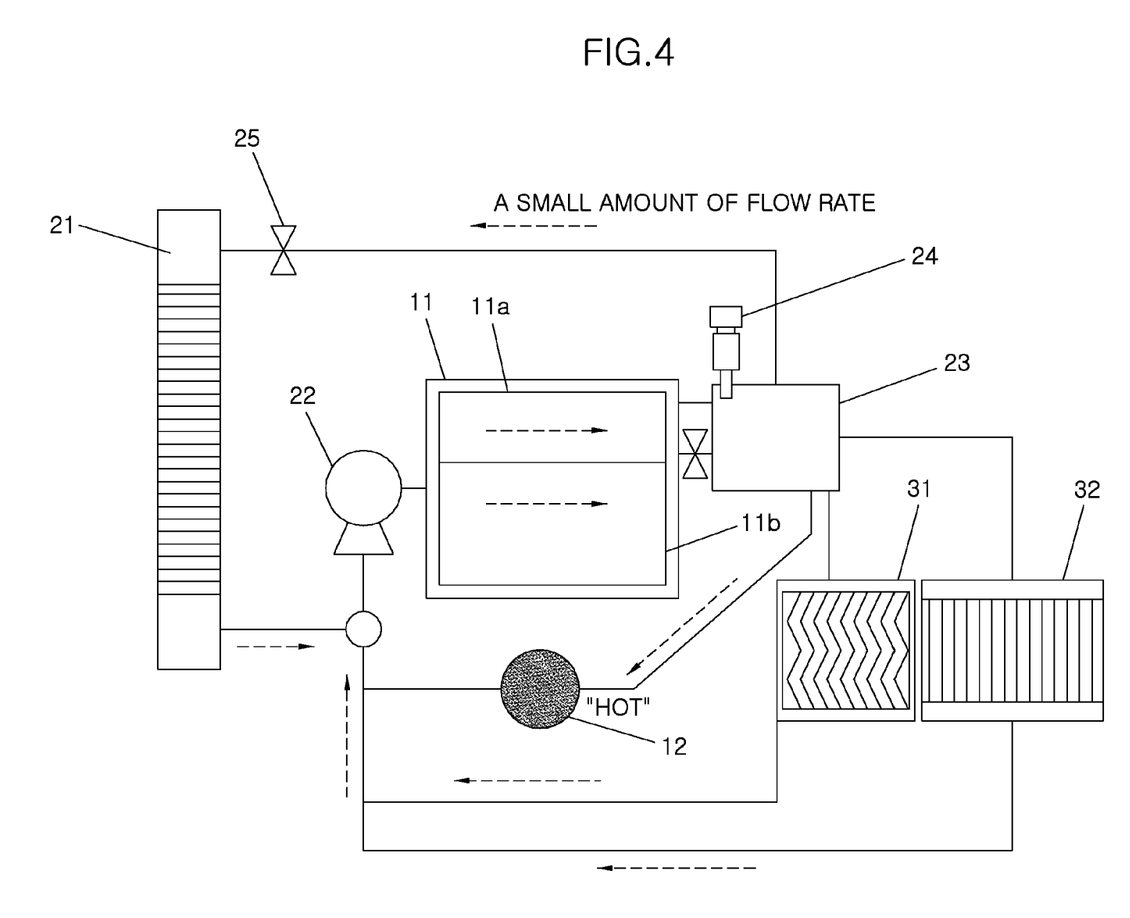
FIG. 4 is a block diagram illustrating a state where the engine coolant temperature and the engine oil temperature exceed a predetermined temperature to assist the cooling of the turbocharger in the engine cooling system for the vehicle applying the turbocharger according to an exemplary embodiment of the present invention.

FIG. 4 is a diagram illustrating a state where the electric water pump 22 starts to operate and a small amount of the coolant circulates.

The ECU circulates a small amount of the coolant according to the coolant temperature and the oil temperature.

The ECU compares the coolant temperature and the oil temperature, which are received from the water temperature sensor 24 and an oil temperature sensor mounted in the oil cooler, with a predetermined temperature to drive the electric water pump 22, circulating the coolant. The electric water pump 22 circulates a small amount of the coolant (coolant of the flow rate smaller than that of upon the normal traveling) while the engine operates at a small output. At the instant time, the electric thermostat 25 is also partially opened so that the coolant is circulated.

Meanwhile, the ECU can control the operation of the electric water pump 22 and the electric thermostat 25 at the coolant temperature and the oil temperature, but the ECU can also control the operation of the electric water pump 22 and the electric thermostat 25 by use of the immediately-before-start-off fuel consumption amount of the engine 11.

Figure 5:
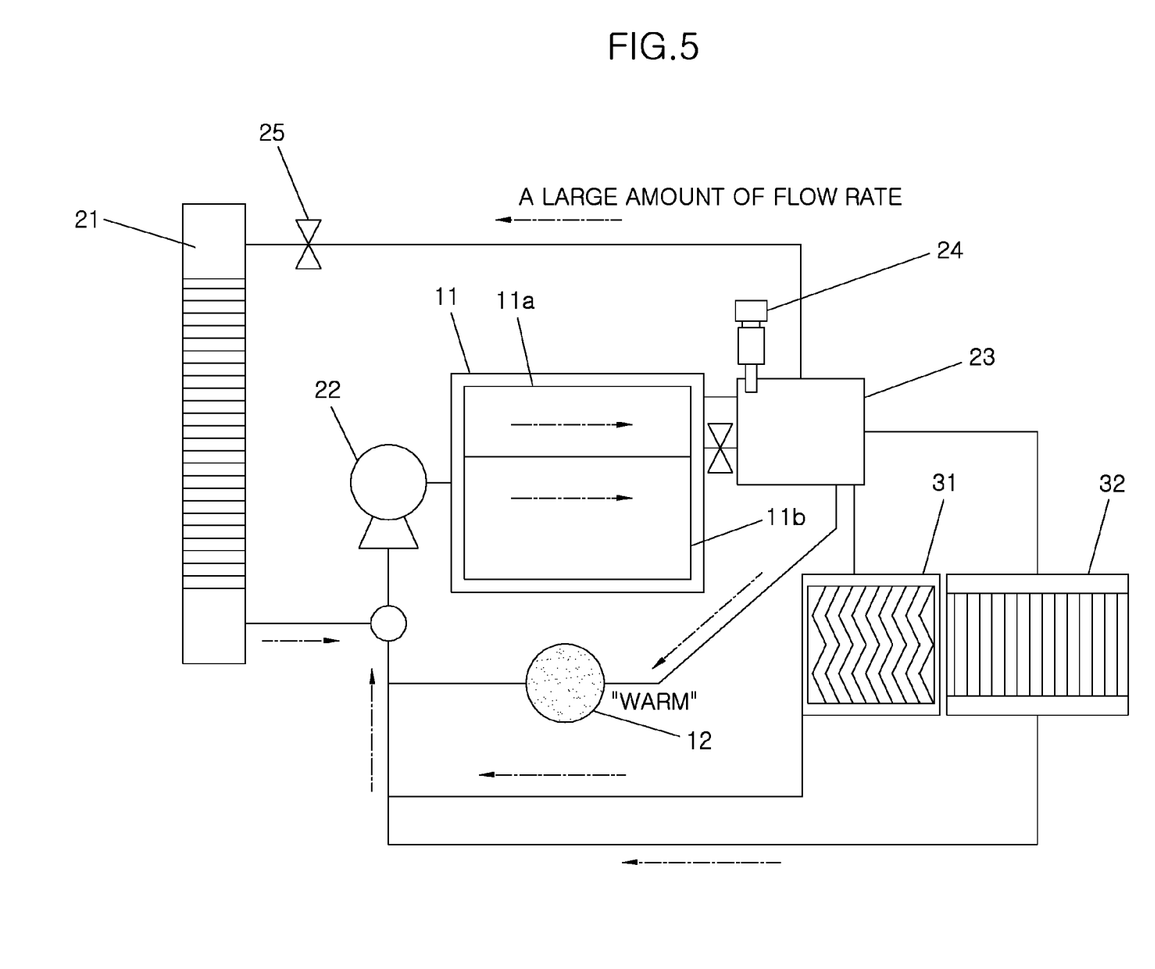
FIG. 5 is a block diagram illustrating a state where the engine coolant temperature and the engine oil temperature exceed the predetermined temperature, and the immediately-before-start-off fuel consumption amount of the engine exceeds a predetermined fuel consumption amount to maximally cool the turbocharger in the engine cooling system for the vehicle applying the turbocharger according to an exemplary embodiment of the present invention.

FIG. 5 is a diagram illustrating that the ECU operates the electric water pump 22 and maximally opens the electric thermostat 25 so that the flow rate of the coolant becomes maximized, cooling the turbocharger 12 and the engine 11.

The ECU compares the coolant temperature and the oil temperature with the after-start-up cooling entrance coolant temperature $T\_C_T$ and the after-start-up cooling entrance oil temperature $T\_O_T$, respectively, and then determines the immediately-before-start-off average fuel consumption amount of the engine 11. The ECU compares the fuel consumption amount consumed in the engine 11 for a predetermined time immediately before the start-off of the engine 11 with a predetermined after-start-up cooling entrance average fuel consumption amount $F_T$ to maximally circulate the coolant after the start-off of the engine 11.

If the immediately-before-start-off average fuel consumption amount of the engine 11 is greater than the after-start-up cooling entrance average fuel consumption amount $F_T$, the coolant is maximally circulated to cool the engine 11 and the turbocharger 12 that have been heated.

The fact that the immediately-before-start-off average fuel consumption amount of the engine 11 is greater than the after-start-up cooling entrance average fuel consumption amount $F_T$ means that the engine 11 was operating at a very high load immediately before the start-off, and at the instant time, the RPM of the turbocharger 12 is also very high in proportion to the RPM, the load, etc. of the engine 11. Therefore, since the temperatures of the engine 11 and the turbocharger 12 immediately after the start-off of the engine 11 are very high, the coolant is maximally circulated to cool the engine 11 and the turbocharger 12 rapidly. The ECU maximally operates the electric water pump 22, and maximally opens the electric thermostat 25.

As in FIG. 4 and FIG. 5, the ECU opens the electric water pump 22 and the electric thermostat 25 to control the flow of the coolant, and the operating times of the electric water pump 22 and the electric thermostat 25 are determined based on the coolant temperature and the immediately-before-start-off average fuel consumption amount.

Figure 6:
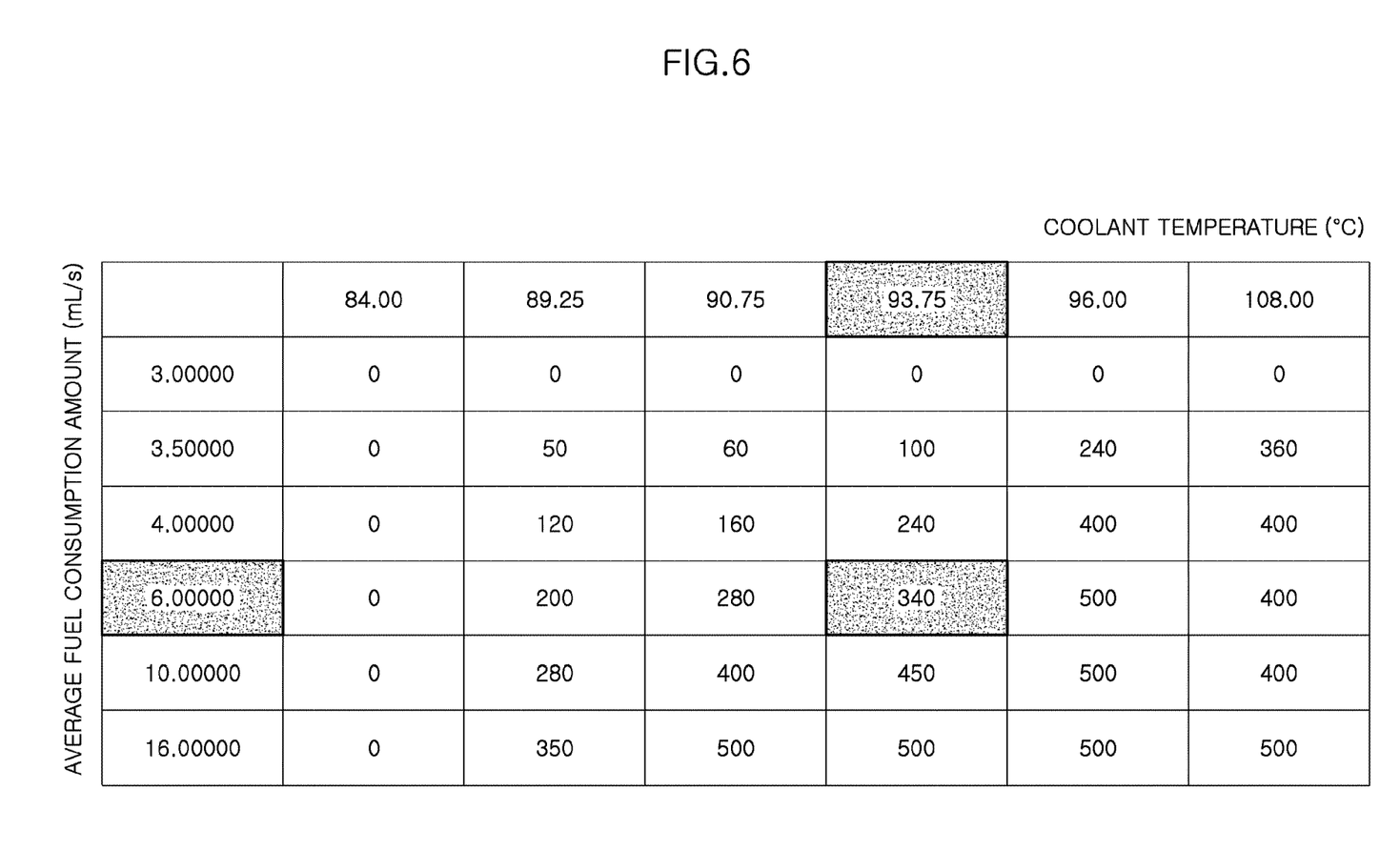
FIG. 6 is a table illustrating a procedure of determining the operating time of an electric water pump in the engine cooling system for the vehicle applying the turbocharger according to an exemplary embodiment of the present invention.

FIG. 6 is a diagram illustrating a procedure of determining the operating time of the electric water pump 22. The ECU determines the operating time of the electric water pump 22 from a map, a table, etc. in which the operating time of the electric water pump 22 according to the coolant temperature and the immediately-before-start-off average fuel consumption amount has been set. For example, when the coolant temperature is 93.75° C. and the immediately-before-start-off average fuel consumption amount is 6 mL/sec, the operating time of the electric water pump 22 is determined as 340 seconds.

Figure 7:
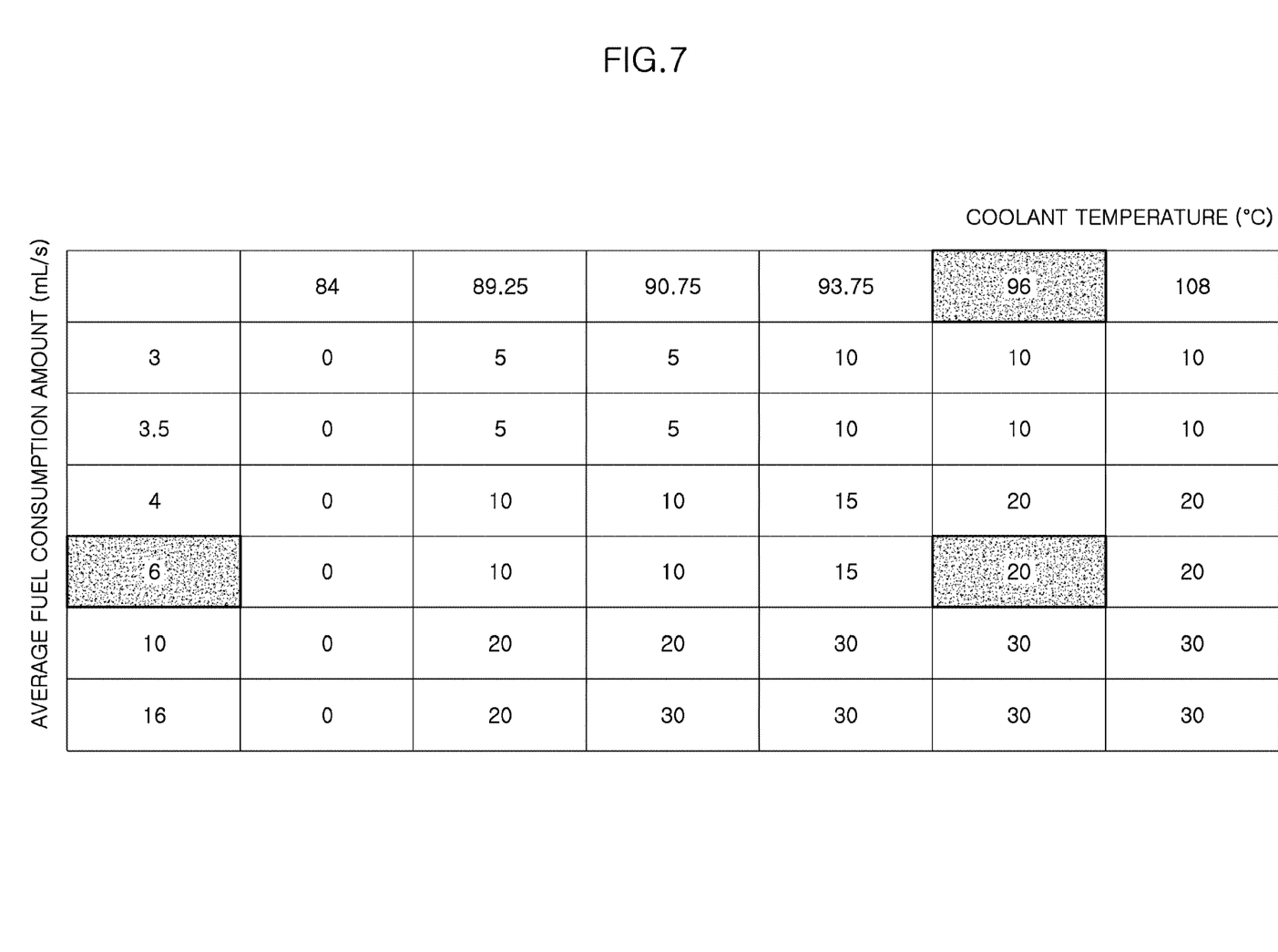
FIG. 7 is a table illustrating a procedure of determining the operating time of an electric thermostat in the engine cooling system for the vehicle applying the turbocharger according to an exemplary embodiment of the present invention.

Meanwhile, FIG. 7 is a diagram illustrating a procedure of determining the operating time of the electric thermostat 25. Even at the instant time, the ECU determines the operating time of the electric thermostat 25 from a map, a table, etc., in which the operating time of the electric water pump 22 according to the coolant temperature and the immediately-before-start-off average fuel consumption amount has been set. For example, when the coolant temperature is 96° C. and the immediately-before-start-off average fuel consumption amount is 6 mL/sec, the operating time of the electric thermostat 25 is determined as 20 seconds.

Figure 8A:
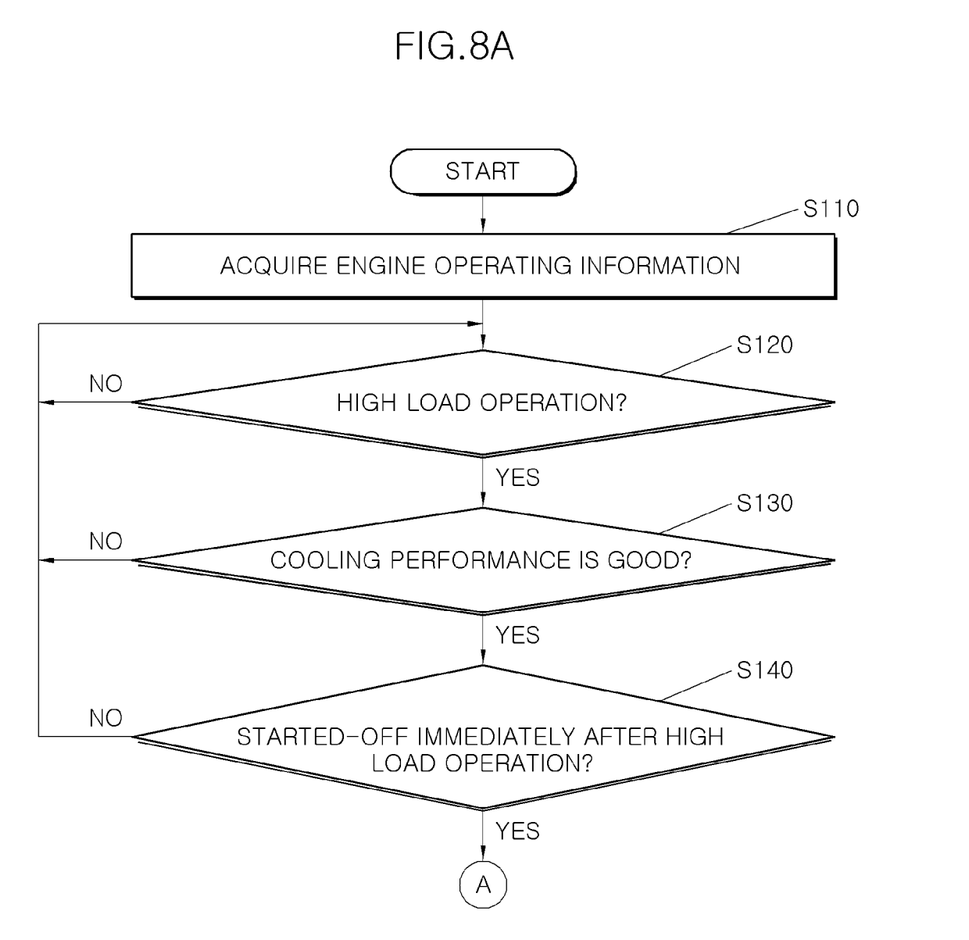
FIG. 8A and FIG. 8B are flowcharts illustrating a method for cooling the engine for the vehicle applying the turbocharger according to an exemplary embodiment of the present invention.
Figure 8B:
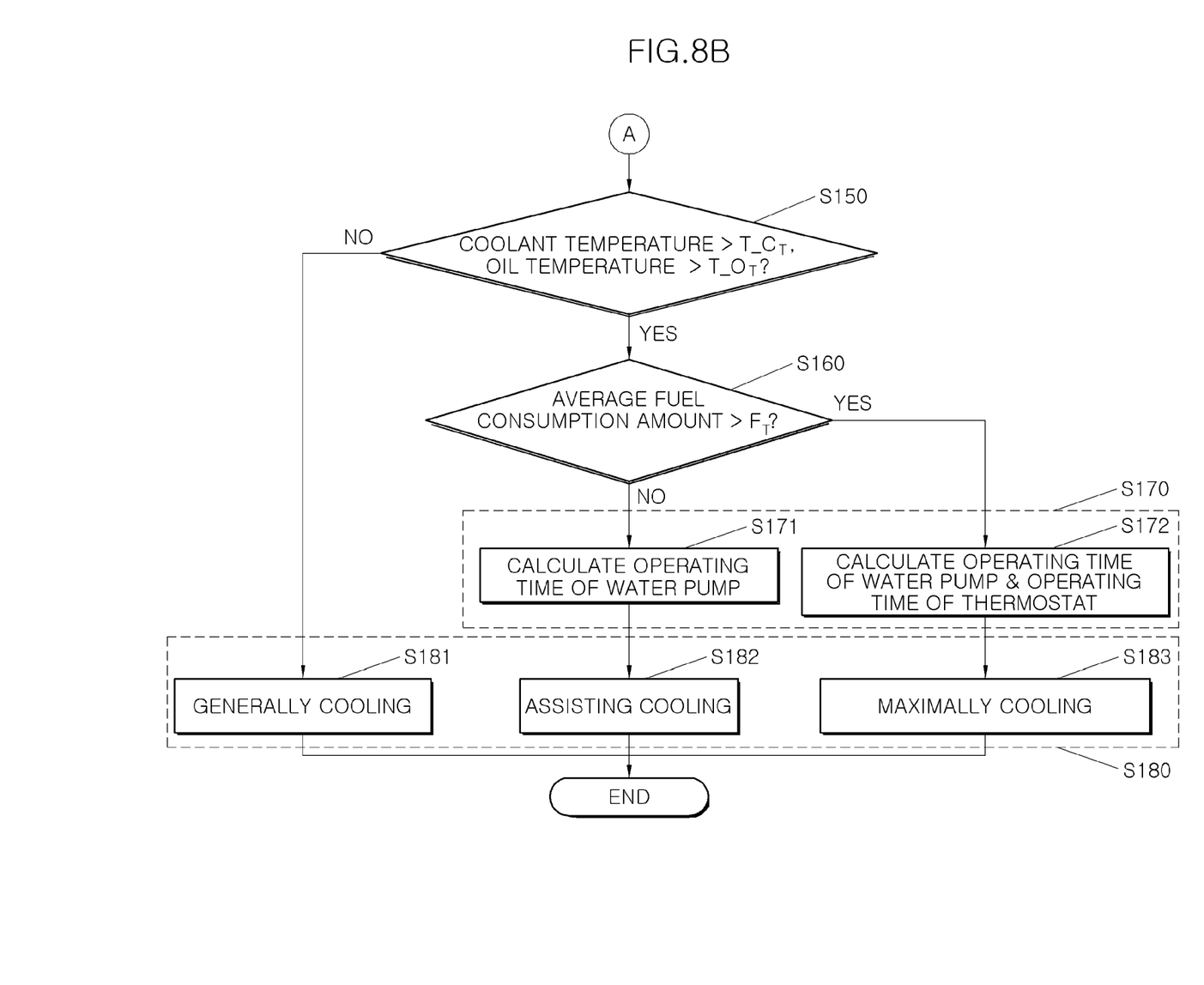

Hereinafter, a method for cooling the engine for the vehicle applying the turbocharger will be described with reference to FIG. 8A and FIG. 8B. The method for cooling the engine for the vehicle applying the turbocharger is performed by being stored in the ECU for the vehicle, and is implemented by use of the engine cooling system for the vehicle applying the turbocharger described above.

Acquiring engine operating information S110 detects, by the ECU, the operating information related to the engine 11 by use of various sensors mounted in the traveling vehicle and the engine. For example, in the acquiring the engine operating information S110, the ECU receives the operating information related to the engine 11 including the load of the engine 11, the RPM of the engine 11, the fuel amount consumed in the engine 11, the coolant temperature, and the engine oil temperature from the sensors.

Determining whether it is operated at a high load S120 determines whether the engine 11 is operated at a high load.

The ECU determines whether the engine 11 is operated at a high load of the after-start-up cooling entrance load or more that has been previously set to cool the turbocharger 12 after the start-up of the engine based on the operating information related to the engine 11 received in the acquiring the engine operating information S110.

Determining whether cooling performance is good S130 determines whether the cooling system of the engine 11 is operating normally.

When it is determined that the engine 11 is operated at a high load in the determining whether it is operated at the high load S120, the ECU determines whether the engine cooling system provided in the vehicle operates normally by comparing the coolant temperature and the engine oil temperature with a predetermined general coolant temperature and a predetermined general oil temperature, respectively to determine that the cooling performance is good. The general coolant temperature and the predetermined general oil temperature may be set to 89.25° C. and 110° C., respectively. For example, it is determined whether the cooling system operates normally by maintaining the coolant temperature as 89.25° C. or less and the engine oil temperature as 110° C. or less. In the vehicle having good cooling performance, when the cooling system normally operates, even if the coolant temperature and the oil temperature are low, the temperature of the turbocharger 12 may be high, and in the instant case, the problem described in the related art can occur. Therefore, as one of the indicators for determining whether additional cooling is required after the start-off, the ECU determines whether the cooling system operates normally in the determining whether it is operated at the high load S120.

Determining whether the engine is started-off immediately after a high load S140 determines whether it has been started-off immediately after the ECU has been operated at a high load. The ECU can determine that it has been started-off immediately after the high load when the engine 11 has been started-off during the high load operation or within a predetermined time after the high load operation has been terminated.

When the acquiring the engine operating information S110, the determining whether it is operated at the high load S120, and the determining whether the cooling performance is good S130 are all satisfied, the determining whether the engine is started-off immediately after the high load S140, which will be described later, is performed.

On the other hand, when the engine 11 is operated in a state where it is not in the high load in the determining whether it is operated at the high load S120, when the cooling performance is not normal in the determining whether the cooling performance is good S130, and when the engine 11 continues to operate after the high load operation in the determining whether the engine is started-off immediately after the high load S140, it is returned to the determining whether it is operated at the high load S120.

Determining whether it is the cooling entrance after the start-off S150 determines whether the coolant is additionally circulated after the start-off of the engine 11 to cool the turbocharger 12 when the engine is started-off immediately after the high load operation.

The ECU determines that the cooling is additionally required after the start-up of the engine 11 when the coolant temperature is higher than the after-start-up cooling entrance coolant temperature $T\_C_T$, and the oil temperature is higher than the after-start-up cooling entrance oil temperature $T\_O_T$. That is, the fact that the coolant temperature and the oil temperature are high is a state where the coolant has been heated by the engine 11 or the turbocharger 12 in a state where the operation of the electric water pump 22 is stopped with the start-off of the engine 11 and thereby the coolant is not circulated. Therefore, it is determined whether the cooling is required after the start-off by use of the coolant temperature and the oil temperature. The determining whether it is the cooling entrance after the start-off S150 determines whether the coolant temperature is higher than 95° C. and the oil temperature is higher than 110° C. When the coolant temperature exceeds 95° C. and the oil temperature exceeds 110° C., the cooling is performed even after the start-up by performing a procedure, which will be described later.

If the coolant temperature is not higher than the after-start-up cooling entrance coolant temperature $T\_C_T$ or the oil temperature is not higher than the after-start-up cooling entrance oil temperature $T\_O_T$ in the determining whether it is the cooling entrance after the start-off S150, additional cooling is not required after the start-off of the engine 11, such that cooling S181 is performed. In the cooling S181, the operation of the electric water pump 22 is also stopped with the start-off of the engine 11, and the electric thermostat 25 is not also additionally opened, being cooled by natural heat-dissipation in a situation where the coolant is not circulated.

Comparing an average fuel consumption amount S160 compares whether the fuel amount consumed in the engine 11 immediately before the start-off of the engine 11 is greater than the predetermined after-start-up cooling entrance average fuel consumption amount $F_T$.

The ECU compares the fuel amount consumed in the engine 11 immediately before the start-off, that is, for a predetermined time before the start-off with the after-start-up cooling entrance average fuel consumption amount $F_T$.

The fact that the average fuel consumption amount of the engine 11 has been greater than the after-start-up cooling entrance average fuel consumption amount $F_T$ means that the engine 11 has been operated in a high load state, and therefore, means that more cooling is required.

Therefore, the ECU determines whether additional cooling is required after the start-off by referring to the average fuel consumption amount of the engine 11, and it is determined in the comparing the average fuel consumption amount S160.

Determining coolant circulating time S170 determines how long the cooling system is operated after the engine 11 has been started-off. In the determining the coolant circulating time S170, determining a cooling assistance operating time S171 or determining a maximum cooling operating time S172 is performed according to the result of the comparing the average fuel consumption amount S160.

The determining the cooling assistance operating time S171 allows the ECU to determine the time at which the electric water pump 22 is operated. The determining the cooling assistance operating time S171 is performed when the immediately-before-start-off average fuel consumption amount is not greater than the after-start-up cooling entrance average fuel consumption amount $F_T$ in the comparing the average fuel consumption amount S160. The fact that the engine 11 has been operated at a high load, but the immediately-before-start-off average fuel consumption amount of the engine 11 is not greater than the after-start-up cooling entrance average fuel consumption amount $F_T$ does not mean that the engine 11 has been operated at the highest level of load, such that the electric water pump 22 is operated so that the coolant may be circulated. Therefore, the determining the cooling assistance operating time S171 determines the time required to operate the electric water pump 22 by the ECU.

Meanwhile, a procedure that the ECU determines the operating time of the electric water pump 22 determines by use of the immediately-before-start-off average fuel consumption amount and the coolant temperature, as illustrated in FIG. 6. The ECU determines the operating time of the electric water pump 22 from a map, a table, etc. In which the operating time of the electric water pump 22 according to the coolant temperature and the immediately-before-start-off average fuel consumption amount has been set. For example, when the coolant temperature is 93.75° C. and the immediately-before-start-off average fuel consumption amount is 6 mL/sec, the operating time of the electric water pump 22 is determined as 340 seconds.

The determining the maximum cooling operating time S172 allows the ECU to determine the time at which the electric thermostat 25 may be additionally operated and the time at which the electric water pump 22 may be additionally operated.

The determining the maximum cooling operating time S172 is performed when the immediately-before-start-off average fuel consumption amount is greater than the after-start-up cooling entrance average fuel consumption amount $F_T$ in the comparing the average fuel consumption amount S160. Since the engine 11 has been operated at a high load, in a state where the immediately-before-start-off average fuel consumption amount of the engine 11 is greater than the after-start-up cooling entrance average fuel consumption amount $F_T$, this has been operated at the highest level of load, such that not only the electric water pump 22 but also the electric thermostat 25 may be opened to be cooled so that the flow rate of the coolant becomes maximized. Therefore, in the determining the maximum cooling operating time S172, the ECU determines the time at which the electric thermostat 25 may be operated together with the time at which the electric water pump 22 may be operated.

In the determining the maximum cooling operating time S172, the operating time of the electric water pump 22 is determined in the same manner as the determining the cooling assistance operating time S171 described above. That is, the operating time of the electric thermostat 25 in the determining the maximum cooling operating time S172 is determined as illustrated in FIG. 7. The ECU determines the operating time of the electric thermostat 25 from a map, a table, etc. In which the operating time of the electric thermostat 25 according to the coolant temperature and the immediately-before-start-off average fuel consumption amount has been set. For example, when the coolant temperature is 96° C. and the immediately-before-start-off average fuel consumption amount is 6 mL/sec, the operating time of the electric thermostat 25 is determined as 20 seconds.

Circulating coolant after the start-off S180 operates the electric water pump 22 or the electric thermostat 25 for the time determined in the determining the coolant circulating time S170.

In the circulating the coolant after the start-off S180, any one of the cooling S181, assisting cooling S182, and maximally cooling S183 may be performed according to the result of the determining whether it is the cooling entrance after the start-off S150 and the determining the coolant circulating time S170.

The cooling S181 may be performed when the coolant temperature is not higher than 95° C. and the oil temperature is not higher than 110° C. in the determining whether it is the cooling entrance after the start-off S150. In the cooling S181, the engine 11 and the turbocharger 12 are cooled without the additional opening of the electric thermostat 25 or the additional operation of the electric water pump 22.

The assisting cooling S182 is performed when the immediately-before-start-off average fuel consumption amount is not greater than the after-start-up cooling entrance average fuel consumption amount $F_T$ in the comparing the average fuel consumption amount S160. When the average fuel consumption amount is not greater than the after-start-up cooling entrance average fuel consumption amount $F_T$, the engine has been operated at a high load immediately before the start-off, but has not been operated at the highest level of load, such that the electric water pump 22 is operated so that the coolant circulates the engine 11 and the turbocharger 12 (see FIG. 4). At the instant time, the operating time of the electric water pump 22 in the assisting the cooling S182 is set so that the electric water pump 22 is operated for the time determined in the determining the cooling assistance operating time S171.

At the instant time, the electric thermostat 25 is operated by the ECU, and in the assisting the cooling S182, the ECU controls so that a part of the electric thermostat 25 is opened to allow a minute amount of flow rate to pass through the electric thermostat 25. The coolant discharged from the electric water pump 22 passes through the cylinder block 11b and the cylinder head 11a to cool the engine 11, and then flows from the path distributor 23 to the turbocharger 12, the electric thermostat 25, the oil cooler, and the heater core 32. The coolant having passed through the electric thermostat 25 through the path distributor 23 is circulated into the electric water pump 22 through the radiator 21. Furthermore, the coolant transmitted to the turbocharger 12 among the coolant having passed through the path distributor 23 cools the turbocharger 12.

The flow rate of the coolant circulated in the assisting the cooling S182 is smaller than the maximally cooling S183, which will be described later.

The maximally cooling S183 is performed when the immediately-before-start-off average fuel consumption amount is greater than the after-start-up cooling entrance average fuel consumption amount $F_T$ in the comparing the average fuel consumption amount S160. When the average fuel consumption amount is greater than the after-start-up cooling entrance average fuel consumption amount $F_T$, the engine has been operated at the highest level of load immediately before the start-off, such that the electric water pump 22 is operated and the electric thermostat 25 is also opened so that the coolant cooled in the radiator 21 circulates the engine 11 and the turbocharger 12 (see FIG. 5).

In the maximally cooling S183, since the ECU operates the electric water pump 22 in a state that has opened the electric thermostat 25, the coolant discharged from the electric water pump 22 passes through the engine 11, and then flows from the path distributor 23 to the turbocharger 12, the electric thermostat 25, the oil cooler 31, and the heater core 32. The flowing from the path distributor 23 to the turbocharger 12, the electric thermostat 25, the oil cooler 31, and the heater core 32 is similar to the assisting the cooling S182, but the electric thermostat 25 is in the maximally opened state. Therefore, the coolant sufficiently cooled in the radiator 21 passes through the engine 11 and the turbocharger 12 because the flow rate passing through the electric thermostat 25 and the radiator 21 increases, such that the cooling performance of the engine 11 and the turbocharger 12 becomes maximized.

At the instant time, the operating time of the electric water pump 22 and the electric thermostat 25 in the maximally cooling S183 is set so that the electric water pump 22 and the electric thermostat 25 are operated for the time determined in the determining the maximum cooling operating time S172.

In the maximally cooling S183, the electric water pump 22 operates in a state where the electric thermostat 25 has been operated (maximally opened state), such that the flow rate of the circulated coolant becomes maximized.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine cooling system for a vehicle including a turbocharger, the engine cooling system comprising:
    an engine, a radiator for cooling a coolant discharged from the engine, and a water pump for supplying the coolant discharged from the radiator to the engine, wherein a portion of the coolant discharged from the engine is circulated into the turbocharger and flows into the water pump,
    a thermostat mounted in a path through which the coolant discharged from the engine flows into the radiator, and configured for controlling an amount of the coolant flowing from the engine to the radiator, and
    a control unit of controlling a circulation of the coolant according to a coolant temperature and an engine oil temperature,
    wherein the control unit is configured to control so that the coolant cooled in the radiator is additionally circulated into the engine and the turbocharger by maximally opening the thermostat so that the coolant flows from the engine to the radiator, and to operate the water pump, when the engine is started-off while the engine operates at a high load of a predetermined after-start-up cooling entrance load, and an average fuel consumption amount consumed in the engine before a start-off of the engine is greater than a predetermined after-start-up cooling entrance average fuel consumption amount.

2. The engine cooling system of claim 1,
    wherein the control unit is configured to determine an operating time of the water pump and an opening time of the thermostat, respectively, according to the coolant temperature and the average fuel consumption amount.

3. The engine cooling system of claim 1,
    wherein the control unit is configured to control so that the coolant cooled in the radiator is circulated into the engine and the turbocharger by not further opening the thermostat additionally and operating the water pump, when the engine is started-off while the engine operates at the high load of the predetermined after-start-up cooling entrance load, and the average fuel consumption amount consumed in the engine before a start-off of the engine is not greater than the predetermined after-start-up cooling entrance average fuel consumption amount.

4. The engine cooling system of claim 3,
    wherein the control unit is configured to determine an operating time of the water pump according to the coolant temperature and the average fuel consumption amount.

5. The engine cooling system of claim 1,
    wherein the control unit is configured to determine when the engine is operated at the high load of the after-start-up cooling entrance load or more that has been previously set to cool the engine and the turbocharger after the start-up of the engine, to determine when a cooling performance of the cooling system is good by comparing the coolant temperature and the engine oil temperature with a predetermined general coolant temperature and a predetermined general oil temperature, respectively to determine that the cooling performance is good while the engine is operated at the after-start-up cooling entrance load or more, and when the coolant temperature and the oil temperature are lower than the predetermined general coolant temperature and the predetermined general oil temperature, respectively, to detect that the engine has been started-off while the engine is operated at the high load of the predetermined after-start-up cooling entrance load or more, and then to compare the average fuel consumption amount consumed in the engine with the predetermined after-start-up cooling entrance average fuel consumption amount.

6. The engine cooling system of claim 5,
wherein the control unit is configured to compare the average fuel consumption amount consumed in the engine before the start-off with the predetermined after-start-up cooling entrance average fuel consumption amount, when the coolant temperature is higher than a predetermined after-start-up cooling entrance coolant temperature, and the engine oil temperature is higher than a predetermined after-start-up cooling entrance oil temperature.

7. The engine cooling system of claim 5,
wherein the control unit is configured to control so that an operation of the water pump is also stopped with the start-off of the engine, and the thermostat is not opened additionally, when the coolant temperature is not higher than a predetermined after-start-up cooling entrance coolant temperature, or the engine oil temperature is not higher than a predetermined after-start-up cooling entrance oil temperature.

8. The engine cooling system of claim 1,
wherein the control unit is an Electronic Control Unit (ECU),
wherein the water pump is an electric water pump and an operation of the electric water pump is controlled by the ECU, and
wherein the thermostat is an electric thermostat for controlling a flow rate of the coolant flowing into the radiator from the engine by the ECU.

9. A method of cooling an engine for a vehicle including a turbocharger, the method comprising:
after a start-up of the engine,
comparing an average fuel consumption amount that determines, by a control unit of controlling an operation of the engine and a circulation of a coolant, when an average fuel consumption amount consumed in the engine before the start-off of the engine is greater than a predetermined after-start-up cooling entrance average fuel consumption amount when the vehicle is started-off after a high load operation, and
maximally cooling that controls, by the control unit, so that the coolant cooled in a radiator is circulated into the engine and the turbocharger by maximally opening a thermostat for controlling so that the coolant flows from the engine to the radiator, and operating a water pump, when the average fuel consumption amount consumed in the engine before the start-off of the engine is greater than the predetermined after-start-up cooling entrance average fuel consumption amount in the comparing the average fuel consumption amount.

10. The method of cooling the engine of claim 9,
wherein determining a maximum cooling operating time that determines a time at which the water pump is configured to be operated additionally and a time at which the thermostat is configured to be opened maximally is performed between the comparing the average fuel consumption amount and the maximally cooling.

11. The method of cooling the engine of claim 10,
wherein in the determining of the maximum cooling operating time, an operating time of the water pump and an opening time of the thermostat are determined, respectively, according to a coolant temperature and the average fuel consumption amount.

12. The method of cooling the engine of claim 9, including:
assisting cooling that controls, by the control unit, so that the coolant cooled in the radiator is circulated into the engine and the turbocharger by not further opening the thermostat additionally and operating the water pump, when the average fuel consumption amount consumed in the engine before the start-off of the engine is not greater than the predetermined after-start-up cooling entrance average fuel consumption amount in the comparing the average fuel consumption amount.

13. The method of cooling the engine of claim 12,
wherein determining a cooling assistance operating time that determines a time at which the water pump is configured to be operated additionally is performed between the comparing the average fuel consumption amount and the assisting the cooling.

14. The method of cooling the engine of claim 13,
wherein the determining of the cooling assistance operating time is to determine an operating time of the water pump according to a coolant temperature and the average fuel consumption amount.

15. The method of cooling the engine of claim 9, further including:
before the comparing the average fuel consumption amount,
acquiring engine operating information that acquires, by the control unit, operating information related to the engine including a load of the engine for the vehicle, a coolant temperature and an engine oil temperature having cooled the engine, and a fuel amount consumed in the engine;
determining when the engine is operated at a high load that determines, by the control unit, when the engine is operated at a high load of an after-start-up cooling entrance load or more that has been previously set to cool the engine and the turbocharger after the start-up of the engine;
determining when cooling performance is good that determines, by the control unit, when the cooling performance of the cooling system is good by comparing the coolant temperature and the engine oil temperature with a predetermined general coolant temperature and a predetermined general oil temperature, respectively to determine that the cooling performance is good while the engine is operated at the after-start-up cooling entrance load or more; and
determining when the engine is started-off after a high load that detects, by the control unit, that the engine has been started-off while the engine operates at a load of the after-start-up cooling entrance load or more, when the coolant temperature and the oil temperature are lower than the predetermined general coolant temperature and the predetermined general oil temperature, respectively,
wherein when the engine is started-off while the engine operates at the load of the after-start-up cooling entrance load or more, the comparing the average fuel consumption amount is performed.

16. The method of cooling the engine of claim 15,
wherein when at least one of the determining of when the engine is operated at the high load, the determining of when the cooling performance is good, and the determining of when the engine is started-off after the high load is not satisfied, the determining of when the engine is operated at the high load, is returned.

17. The method of cooling the engine of claim 15, further including:
- determining when it is cooling entrance after the start-off that compares, by the control unit, the coolant temperature and the engine oil temperature with a predetermined after-start-up cooling entrance coolant temperature and a predetermined after-start-up cooling entrance oil temperature, respectively, between the determining of when the engine is started-off after the high load and the comparing the average fuel consumption amount,
- wherein when the coolant temperature is higher than an after-start-up cooling entrance coolant temperature, and the engine oil temperature is higher than an after-start-up cooling entrance oil temperature in the determining of when it is the cooling entrance after the start-off, the comparing the average fuel consumption amount is performed.

18. The method of cooling the engine of claim 17,
- wherein when the coolant temperature is not higher than the after-start-up cooling entrance coolant temperature, or the engine oil temperature is not higher than the after-start-up cooling entrance oil temperature in the determining of when it is the cooling entrance after the start-off,
- normally cooling that stops an operation of the water pump with the start-off of the engine, and not opens the thermostat additionally is performed.

* * * * *